2,920,061
6-(α-VINYLOXYALKYL)-2,4-DIAMINO-s-TRIAZINES AND POLYMERS THEREOF

Frederic C. Schaefer, Darien, Conn., assignor to American Cyanamid Company, New York, N.Y., a corporation of Maine No Drawing. Application January 17, 1956
Serial No. 559,523

15 Claims. (Cl. 260—67.6)

This invention relates to new and novel vinyloxyalkyl-substituted diaminotriazines and to polymers produced therefrom. More particularly, it relates to 6-[α-vinyloxy(lower)alkyl]-2,4-diamino-s-triazines characterized by the formula:

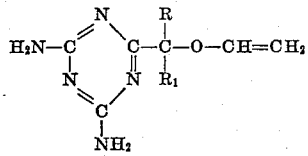

wherein R and $R_1$, respectively, are hydrogen or (lower)-alkyl radicals, for instance methyl and ethyl, which are the same or different; to methods of making such triazines; and to polymers derived therefrom.

The vinyloxyalkyl-substituted diamino-symmetrical triazines of the present invention are capable of forming useful resins. For example, they homopolymerize in the presence of a strong acid. The homopolymerized resins can be further reacted with formaldehyde to form unusually hard resinous films. Alternatively, the s-triazines of the invention may be condensed with one to four mols of formaldehyde and subsequently polymerized to form a hard film.

According to the present invention, the novel triazines defined above are prepared by reacting approximately equimolar quantities of dicyandiamide and an α-vinyloxy-(lower)alkanenitrile. This reaction may be illustrated by the following general equation:

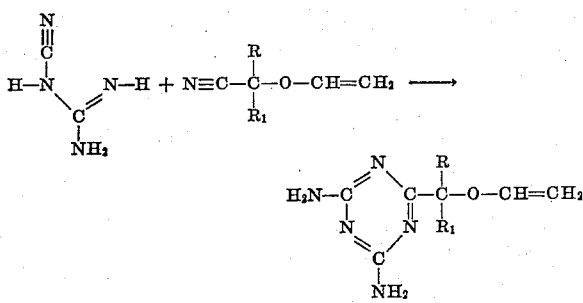

in which R and $R_1$ have the meanings above indicated. The reaction proceeds smoothly at temperatures between about 75° C. and about 150° C. Advantageously, a slight excess of dicyandiamide is employed. Such excesses insure good yields of the s-triazines.

INTERMEDIATE PREPARATION

The α-vinyloxyalkanenitrile reactant can be synthesized by various known methods. One convenient process involves the reaction between vinyl acetate and a (lower)-alkyl cyan-alcohol of the formula:

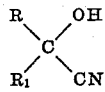

wherein R and $R_1$, respectively, are hydrogen or (lower)-alkyl radicals. Typically illustrative of the cyan-alcohol compounds are glycolonitrile and lactonitrile. Reaction between the latter nitriles and vinyl acetate is conducted at from about 0° C. to 25° C. in the presence of small amounts of a mercury salt of a weak acid, such as mercuric acetate. Advantageously, a polymerization inhibitor may also be added in catalytic amounts, for instance copper naphthenate. The following examples are given by way of illustration to exemplify the preparation of the vinyloxy(lower)alkanenitrile reactant.

Example A
PREPARATION OF VINYLOXYACETONITRILE 1.0 mol of anhydrous glycolonitrile, 2.5 mols of vinyl acetate, 0.001 g. copper naphthenate, 0.01 mol of mercuric acetate, and 0.006 mol of sulfuric acid were charged to a reaction flask in the above order at 0° C. while stirring. After 45 minutes, the contents were poured into a vigorously stirred sodium carbonate solution containing 0.5 mol of sodium carbonate in 1 liter of water. An organic phase separated from the aqueous phase in several minutes. The organic phase was removed from the flask, washed with dilute sodium carbonate and dried over potassium carbonate. The dried organic liquid was next fractionally distilled under a reduced pressure of about 37 mm. Hg. The fraction, boiling at 55° C.–58° C., was substantially pure vinyloxyacetonitrile having an index of refraction ($N_D^{25}$) of 1.4147. Yield is approximately 34%.

Example B
PREPARATION OF α-VINYLOXYPROPIONITRILE 1.0 mol of lactonitrile, 4.0 mols of vinyl acetate, 1 drop of commercial copper naphthenate, 0.01 mol of mercuric acetate and 0.006 mol of sulfuric acid were added in the above order to a reaction flask at 25° C. while stirring. The mixture was stirred for 40 minutes and then poured into a vigorously stirred solution of 0.5 mol sodium carbonate in 1 liter of water. An organic phase separated from the aqueous phase after a few minutes. The organic phase was removed, washed with dilute sodium carbonate and dried over Drierite (anhydrous calcium sulfate). The dried organic liquid was next fractionally distilled under a reduced pressure of about 57 mm. Hg. The fraction, boiling at 63° C.–63.5° C., was collected and identified as substantially pure α-vinyloxypropionitrile, having an index of refraction ($N_D^{25}$) of 1.4085.

Other vinyloxyalkanenitriles which may be similarly prepared include for instance: α-methyl-α-vinyloxypropionitrile and α-methyl-α-vinyloxybutylronitrile.

MONOMERIC s-TRIAZINE PREPARATION

The monomeric compounds of the present invention, α-vinyloxy(lower)alkyl-2,4-diamino-s-triazines, are prepared by reacting approximately equimolar amounts of the appropriate α-vinyloxy(lower)alkanenitrile and dicyandiamide. Advantageously, the reaction is carried out in the presence of a strong inorganic base, such as the hydroxides of potassium, sodium or lithium, and an inert organic solvent, for instance butanol or methoxy ethanol, and at temperatures between 75° C. and 150° C., and preferably between 100° C. and 125° C. The monomeric s-triazines so prepared are capable of homopolymerization in the presence of catalytic amounts of strong acids, such as sulfuric, phosphoric, hydrochloric, paratoluene sulfonic acid and the like.

To facilitate a further understanding of the present invention, the following examples are presented for purposes of illustration. They are not intended to be limitative except as defined in the claims. Unless otherwise stated, the parts are by weight.

Example 1
6-VINYLOXYMETHYL-2,4-DIAMINO-s-TRIAZINE 1.1 mols of dicyandiamide, 4.0 parts of potassium hydroxide, 273 parts of anhydrous butanol were charged into a reaction vessel. The mixture is rapidly heated to about 110° C. while adding from about 0.05 mol of vinyloxyacetonitrile, prepared as in Example A. A total of 1.0 mol of the nitrile is added under reflux during a forty-five minute interval. When the addition of the nitrile had been completed, heating was continued for an additional hour at 120° C. The reaction mixture was next chilled to crystallize the 2,4-diamino-s-triazine derivative. The crystallized compound is washed with ethanol and then with water. The washed substituted s-triazine is oven dried at 100° C.–120 C. and recovered in an 87.5% yield. The dried s-triazine has a melting point of 212° C. and is soluble in water to the extent of 10 parts per 100 parts of water at 100° C. Theoretically, the compound analyzes as: 43.1% C; 5.4% H; 41.9% N; but actually analyzed as: 42.9% C; 5.4% H; 42.2% N.

*Example 2*

6-(α-VINYLOXYETHYL)-2,4-DIAMINO-s-TRIAZINE

The procedure of Example 1 is repeated except that 1.1 mols of α-vinyloxypropionitrile prepared as in Example B is substituted for vinylacetonitrile. A yield of 85.5% of 6-(α-vinyloxyethyl)-2,4-diamino-s-triazine is obtained. It has a melting point of 172° C.–174° C. and is soluble in water to the extent of 19 parts per 100 parts of water at 100° C. The compound, which theoretically analyzes as: 46.42% C, 6.12% H, 38.68% N, analyzed as: 46.14% C, 6.16% H and 38.86% N.

Other monomeric s-triazines can be similarly prepared. Accordingly, the nitrile of Example 1 or 2 can be substituted by other nitriles, such as α-methyl-α-vinyloxypropionitrile and α-methyl-α-vinyloxybutyronitrile to form the corresponding monomeric s-triazines.

To demonstrate the utility of the 6-vinyloxy(lower)-alkyl-2,4-diamino-s-triazines as resin formers, the following is presented in which the compound of Example 2 is illustratively employed.

*Example 3*

1.8 parts of 6-(α-vinyloxyethyl)-2,4-diamino-s-triazine is suspended in 100 parts of water to which 1 part of phosphoric acid has been added. The solution is heated to 90° C. for 5 hours. During the heating period, the s-triazine has dissolved.

A portion of the resinous solution was used to cast a film upon a glass surface. The latter was then dried at 150° C. Resultant film was clear, slightly yellow and tacky.

Another portion of the resinous solution was further reacted with formaldehyde at 90° C. for 1 hour. The formaldehyde: s-triazine ratio employed is 2:1. From the resultant stable solution thus prepared, a film was cast and dried at 150° C. This film was clear, very slightly yellow in color and hard.

Where 6-(vinyloxymethyl)-2,4-diamino-s-triazine is substituted for 6-(α-vinyloxyethyl)-2,4-diamino-s-triazine in Example 3, a similar polymeric film as in that example is obtained. However, when either hydrochloric acid or sulfuric acid is substituted for the acid of Example 3, no change in resultant resin is observed.

I claim:

1. As a new composition of matter s-triazines selected from the group consisting of 6-[α-vinyloxyalkyl]-2,4-diamino-s-triazines wherein the alkyl group contains 1–4 carbon atoms.

2. A compound represented by the formula:

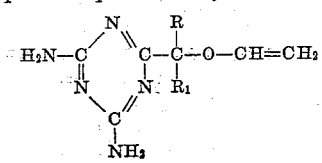

wherein R and $R_1$, respectively, are selected from the group consisting of hydrogen methyl and ethyl.

3. A compound: 6-vinyloxymethyl-2,4-diamino-s-triazine.

4. A compound: 6-(α-vinyloxyethyl)-2,4-diamino-s-triazine.

5. The process for preparing a 6-[α-vinyloxyalkyl]-2,4-diamino-s-triazine wherein the alkyl group contains 1–4 carbon atoms which comprises: bringing into reaction a α-vinyloxy lower alkanenitrile and dicyandiamide in substantially equimolar amounts in the presence of a catalytic amount of a strong inorganic base at a temperature between about 75° C. and 150° C., and recovering the s-triazine thus-formed.

6. The process for preparing 6-vinyloxymethyl-2,4-diamino-s-triazine which comprises: reacting vinyloxyacetonitrile and dicyandiamide in substantially equimolar amounts in the presence of a catalytic amount of a strong inorganic base at a temperature between 75° C. and 150° C., and recovering 6-vinyloxymethyl-2,4-diamino-s-triazine.

7. The process for preparing 6-(α-vinyloxyethyl)-2,4-diamino-s-triazine which comprises: reacting α-vinyloxypropionitrile and dicyandiamide in substantially equimolar amounts in the presence of a catalytic amount of a strong inorganic base at a temperature between about 75° C. and 150° C., and recovering 6-(α-vinyloxyethyl)-2,4-diamino-s-triazine.

8. A polymeric 6-[α-vinyloxyalkyl]-2,4-diamino-s-triazine wherein the alkyl group contains 1–4 carbon atoms prepared by heat reacting a monomeric 6-(α-vinyloxy lower alkyl)-2,4-diamino-s-triazine in the presence of a strong acid.

9. Polymeric 6-vinyloxymethyl-2,4-diamino-s-triazine prepared by heat reacting monomeric 6-vinyloxymethyl-2,4-diamino-s-triazine in the presence of a strong acid.

10. Polymeric 6-(α-vinyloxyethyl)-2,4-diamino-s-triazine prepared by heat reacting monomeric 6-(α-vinyloxyethyl)-2,4-diamino-s-triazine in the presence of a strong acid.

11. A method for preparing polymeric 6-[α-vinyloxyalkyl]-2,4-diamino-s-triazine wherein the alkyl group contains 1–4 carbon atoms which comprises: reacting monomeric 6-[α-vinyloxyalkyl]-2,4-diamino-s-triazine in the presence of a strong acid.

12. A method for preparing polymeric 6-vinyloxymethyl-2,4-diamino-s-triazine which comprises: reacting monomeric 6-vinyloxymethyl-2,4-diamino-s-triazine in the presence of a strong acid.

13. A method for preparing polymeric 6-(α-vinyloxyethyl)-2,4-diamino-s-triazine which comprises: reacting monomeric 6-(α-vinyloxyethyl)-2,4-diamino-s-triazine in the presence of a strong acid.

14. The condensation product of monomeric 6-[α-vinyloxyalkyl]-2,4-diamino-s-triazine wherein the alkyl group contains 1–4 carbon atoms and formaldehyde in the mol ratio of about 1 to 2.

15. The condensation product of polymeric 6-[α-vinyloxyalkyl]-2,4-diamino-s-triazine wherein the alkyl group contains 1–4 carbon atoms and formaldehyde in the mol ratio of about 1 to 2.

References Cited in the file of this patent

UNITED STATES PATENTS

| | | |
|---|---|---|
| 2,496,097 | Kroppa | Jan. 31, 1950 |
| 2,689,228 | Thomas | Sept. 14, 1954 |
| 2,694,687 | Benneville et al. | Nov. 16, 1954 |
| 2,777,848 | Schaefer | Jan. 15, 1957 |